US007364793B2

(12) United States Patent
Paulsen et al.

(10) Patent No.: US 7,364,793 B2
(45) Date of Patent: Apr. 29, 2008

(54) POWDERED LITHIUM TRANSITION METAL OXIDE HAVING DOPED INTERFACE LAYER AND OUTER LAYER AND METHOD FOR PREPARATION OF THE SAME

(75) Inventors: Jens M. Paulsen, Daejeon (KR); Munju Kim, Seoul (KR); Joon Sung Bae, Daejeon (KR); Jaeup Jang, Daejeon (KR); Hong-Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 412 days.

(21) Appl. No.: 10/949,926

(22) Filed: Sep. 24, 2004

(65) Prior Publication Data
US 2006/0071198 A1   Apr. 6, 2006

(51) Int. Cl.
   *H01M 4/52*      (2006.01)
   *H01M 4/50*      (2006.01)
   *C01G 51/04*     (2006.01)
   *C23C 22/34*     (2006.01)
   *C23C 22/36*     (2006.01)

(52) U.S. Cl. .................. 428/402; 428/403; 428/357; 252/182.1; 252/518.1; 252/519.1; 252/521.2; 429/218.1; 429/223; 429/224; 429/231.1; 429/231.6; 429/231.95; 423/594.3; 423/594.4; 423/599; 427/214; 427/215

(58) Field of Classification Search ................ 252/500, 252/182.1; 429/231.95, 231.6, 223, 231.3, 429/224, 231.1, 218.1; 428/402, 403; 427/214, 427/215; 264/446, 447; 423/594.3, 599, 423/594.4
See application file for complete search history.

(56) References Cited

U.S. PATENT DOCUMENTS

| 6,372,385 | B1* | 4/2002 | Kweon et al. ......... 429/231.95 |
| 6,596,435 | B2* | 7/2003 | Kelley et al. ............ 429/218.1 |
| 6,613,479 | B2 | 9/2003 | Fukuzawa et al. ..... 429/231.95 |
| 2002/0014222 | A1 | 2/2002 | Ishikawa .................... 123/488 |
| 2003/0104279 | A1* | 6/2003 | Miyazaki et al. ......... 429/231.3 |
| 2003/0108790 | A1* | 6/2003 | Manthiram et al. ...... 429/218.1 |
| 2004/0091780 | A1 | 5/2004 | Kinoshita et al. ......... 429/231.1 |

OTHER PUBLICATIONS

"Improving the Capacity Retention of LiCoO2 Cyled to 4.5 V by Heat-Treatment"; Authors: Zhaohui Chen and J. R. Dahn; Electrochemical and Solid-State Letters 7 (1); pp. A11-A14; 2004.

* cited by examiner

*Primary Examiner*—J. A. Lorengo
*Assistant Examiner*—Kallambella Vijayakumar
(74) *Attorney, Agent, or Firm*—Cantor Colburn LLP (57) ABSTRACT

The present invention provides a powdered lithium transition metal oxide useful as a major component for cathode active material of rechargeable lithium batteries, comprising a lithium transition metal oxide particle, a doped interface layer formed near the surface of the particle, and a thermodynamically and mechanically stable outer layer, and a method of preparing the same.

19 Claims, 4 Drawing Sheets

POWDERED LITHIUM TRANSITION METAL OXIDE HAVING DOPED INTERFACE LAYER AND OUTER LAYER AND METHOD FOR PREPARATION OF THE SAME

TECHNICAL FIELD

The present invention relates to a powdered lithium transition metal oxide useful as a major component for cathode active materials of rechargeable lithium batteries and a method of preparing the same. More specifically, the present invention provides a powdered lithium transition metal oxide comprising a lithium transition metal oxide particle, a cation doped interface layer formed near the surface of the particle, and a thermodynamically and mechanically stable outer layer, the doped interface layer being a reaction product of the lithium transition metal oxide and a strong lithium acceptor compound supplying the cation.

BACKGROUND OF THE INVENTION

It is desirable to increase the energy density of lithium ion batteries. This is generally achieved by increasing the operating voltage and/or by increasing the capacity. For example, $LiCoO_2$-based batteries are usually charged to about 4.2 V and the capacity of $LiCoO_2$ is less than 150 mAh/g at this voltage. On the other hand, $LiNiO_2$-based batteries are charged to still lower voltage.

Increasing the charging voltage of $LiCoO_2$-based batteries to 4.3, 4.4 or 4.5 V versus $Li/Li^+$ will significantly increase the reversible capacity of $LiCoO_2$ to about 155, 175 or 195 mAh/g. $LiNiO_2$-based batteries can achieve a similar capacity at lower voltage. Increasing the charging voltage, however, causes some problems such as the excessive evolution of gas, excessive build-up of cell resistance, decomposition of electrolyte, etc. These problems become more serious, especially during cycling or storage at elevated temperatures.

Many publications and patents have suggested coating approaches to protect the surface of cathode active materials (active material of positive electrode) and the improvement of high voltage cycling stability by this method was confirmed. However, in many cases, the observed improvement did not result from an effective coating but from a shorter air exposure of the coated material after heat treatment (Z. Chen, J. R. Dahn, Electrochemical and solid state letters 7 (1) A11-A14). Application of the described coated material to commercial batteries did not sufficiently solve the high voltage and elevated temperature problems.

Although it was confirmed that avoiding air exposure for a long time can improve material properties to some degree, especially during cycling at room temperature and in small cells, it is generally difficult to implement shorter air exposure during large scale production, and relevant properties are not sufficiently improved under more severe conditions such as high voltage and elevated temperature.

In order to overcome these problems, several patent applications suggest addition of LiF; for example, U.S. Publication No. 2004-91780 A1 discloses the addition of LiF and LiOH to mixed hydroxides prior to a solid state reaction, and U.S. Publication No. 2002-14222 A1 discloses doping of halogen to high crystalline $LiCoO_2$. However, the film-forming property of LiF is generally poor, because LiF is not a lithium acceptor and does not contain a dopant cation, thus a chemical reaction between LiF and the surface of the particle is absent. As such, the surface is less protected, whereby the high temperature/high voltage properties cannot be sufficiently improved, or a large amount of LiF needs to be added, which however decreases the capacity.

As an alternative approach, U.S. Publication No. 2003-104279 A1 discloses the addition of $MgF_2$ as a dopant compound to $LiCoO_2$. $MgF_2$ might be suitable for spinel or Li—Ni—Mn—Co-based materials, but it is not recommended in the case of $LiCoO_2$. Firstly, $Mg^{2+}$ is a less suitable dopant for $LiCoO_2$ than $Al^{3+}$. While a solid state solution represented as $LiCo_{1-x}Al_xO_2$, i.e., a solid state solution of $LiCoO_2$ and Al, is well known, it has been not confirmed whether a solid state solution can be obtained from $LiCoO_2$ and Mg. If the solid state solution of $LiCoO_2$ and Mg could be made to exist, it would result in a defective structure and deviate from $Li^IM^{III}O_2$ representing an ideal composition of solid state solution. Secondly, the melting point of $MgF_2$ is very high, thus the reaction kinetics at the surface is low and the tendency to form a thin protective film is reduced.

U.S. Pat. No. 6,613,479 discloses the doping of fluorine to layered $LiMnO_2$, including doped $LiMnO_2$, wherein different classes of materials are dealt with and Mn is trivalent. However, the materials in the above patent are prepared in inert gas at low temperature and also generally have poor crystallinity. As will be illustrated later, the powdered lithium transition metal oxide of the present invention can be prepared in air and is also stable in air and is crystalline, and furthermore, the manganese would be tetravalent.

In addition, many prior arts show various coatings such as oxides, phosphates, borates, glassy phases etc., surrounding particles of cathode active material, and they are generally made by coating techniques such as dipping, sol-gel, slurries containing sub-micrometer particles, dry coating, etc. For example, in U.S. Pat. No. 6,372,385, cathode powders are dipped into a gel. However, these prior arts fail to provide lithium transition metal oxide having thermodynamically and mechanically stable properties.

SUMMARY OF INVENTION

The objects of the present invention are to completely solve the problems described above.

An object of the present invention is to provide a powdered lithium transition metal oxide being thermodynamically and mechanically stable and useful for cathode active materials.

Another object of the present invention is to provide a method of preparing the powdered lithium transition metal oxide in a simple process.

A further object of the present invention is to provide a cathode active material comprising the powdered lithium transition metal oxide.

In order to accomplish these objects, there is provided in the present disclosure a powdered lithium transition metal oxide comprising a lithium transition metal oxide particle, a cation doped interface layer formed near the surface of particle, and a thermodynamically and mechanically stable outer layer, with the cation doped interface layer being a reaction product of (i) the lithium transition metal oxide and (ii) a strong lithium acceptor compound supplying the cation. Preferably, the cation is Al, and the strong lithium acceptor compound is lithium cryolite.

As described above, the powdered lithium transition metal oxide of the present invention has an outer layer covering the surface of the particle in the form of a dense, thin film, and a doped interface layer, as an intermediate layer, which is formed below the surface of the particle and the outer layer thereof.

The lithium transition metal oxide has a layered or spinel crystal structure and can be represented by the general formula $Li_xMO_2$, wherein M is a transition metal selected from the group consisting of manganese, cobalt and nickel, or a combination of two or more thereof, and x is in the range of $0<x<1$. M can also further contain a small amount of other cations known in the art. The stoichiometry x is about 0.5 if M is predominantly manganese, and in this case, the crystal structure is spinel. If the crystal structure is layered, the stoichiometry x is about 1.

The doped interface layer is a reaction product of two types of components: one is a lithium transition metal oxide and the other is a dopant cation-containing strong lithium acceptor compound (hereinafter, sometimes referred to as "primary salt"), as will be illustrated later in more detail. The dopant cation and strong lithium acceptor in the primary salt serve to dope the surface of lithium transition metal oxide particle and simultaneously extract some lithium ions therefrom to activate the surface, enabling the reaction whereby the surface is converted into the doped interface layer and the outer layer is formed.

According to the experiments conducted by the inventor of the present invention, it was found that the most preferable dopant is Al or Al/Mg and the most preferable lithium acceptor is phosphate and/or fluorine anions. The preferable concentration of fluorine anion is 0.5~5% by atoms F per transition metal cation, and the preferable concentration of phosphate anion is 0.2~2% by atoms per transition metal cation.

The outer layer is of a compound comprising lithium and the strong lithium acceptor in which some lithium is extracted from the lithium transition metal oxide by the action of the strong lithium acceptor.

The present invention also provides a method of preparing the powdered lithium metal oxide as defined above, comprising the steps of:

(a) coating the surface of a powdered lithium transition metal oxide precursor with a salt being a strong lithium acceptor and containing a dopant cation; and (b) subjecting a salt-coated precursor to heat treatment at a temperature of not less than 700° C.

Therefore, the method according to the present invention involves the addition of a salt containing dopant cation and anion, with the anion being a strong lithium acceptor, to the powdered lithium metal oxide precursor, and the heat treatment during which the dopant cation forms a doped interface layer by a solid state solution reaction with the lithium transition metal oxide, and the anion together with extracted lithium forms an outer layer having high thermodynamic stability. Preferably, the cation is aluminum, and the primary salt is lithium cryolite.

Further, the present invention provides a cathode active material comprising the powdered lithium metal oxide as defined above.

DETAILED DESCRIPTION OF PREFERRED EMBODIMENTS

The powdered lithium transition metal oxide according the present invention is useful as a major component for the cathode active material of secondary batteries. More specifically, the powdered lithium transition metal oxide is stable against a reduction of the surface during prolonged exposure to air before assembly of a battery and also stable against a reaction with an electrolyte, especially in the charged state, thereby achieving reduced evolution of gas and high cycling stability together with reduced build-up of resistive layers. Such improvement is achieved by an outer layer, formed on the surface of the lithium transition metal oxide, in combination with a doped interface layer.

The lithium transition metal oxide is made of, for example, Li—Mn—O based spinels or Li-M-O$_2$ based layered transition metal oxides. The transition metal M of the layered phase dominantly consists of manganese, nickel or cobalt. M may additionally contain a small amount of cationic dopants such as Mg, Al, Ti, Cu, Fe, Zn, Ta, Cr, B, Ga. etc., not exceeding 10% by atoms, and also contain further a smaller amount of other dopants known in the art, not exceeding 2% by atoms. The particularly preferred lithium transition metal oxide is LiCoO$_2$ having a layered crystal structure, but similar benefits are observed as well for other compositions of layered phases and for spinel phases, for example, a mixed Li—Mn—Ni—Co-oxide having a layered crystal structure.

A dopant cation ("cationic dopant") in the doped interface layer is a cation such as $Al^{3+}$, $Mg^{2+}$, etc. which can replace a transition metal cation in the lithium transition metal oxide. In a preferred embodiment, the dopant cation is an aluminum ion.

We do not fully understand why the dopant cation which is able to form a solid state solution with the lithium transition metal oxide is essential. It can be speculated that the interface between the salt and the lithiated transition metal oxide is chemically and mechanically stabilized because the dopant cation can act as a "connector" between the doped lithium transition metal oxide surface and the secondary salt. It can be argued that an interface between a solid AB and a salt CD is more stable if both A and C are doped by the same dopant X; i.e. the surface is between a solid $A_{1-x}X_xB$ and a solid $C_{1-y}X_yD$ where X acts as bridging cation.

The outer layer forms a surface film which is mechanically stable and also has high thermodynamic stability under cathodic conditions to at least 5V versus Li/Li+. This stability exceeds the binding energy of lithium in the lithiated transition metal oxide.

According to the preparation method of the present invention, the surface of a lithium transition metal oxide particle is first coated with a salt being a strong lithium acceptor containing a dopant cation ("primary salt"). The term "coated" used in the present disclosure means the partial coating as well as the full coating and is also intended to include the case where the primary salts are in partial contact with the surface of lithium transition metal oxide particle.

The primary salt may be of a single salt phase or a mixture of two or more salt phases. At least one salt phase contained in the primary salt is characterized to be a strong lithium acceptor compound, strong enough to delithiate the lithium transition metal oxide precursor during the following heat treatment. The primary salt is furthermore characterized to contain a cation acting as dopant. The cationic dopant forms a solid state solution with the lithium transition metal oxide and/or delithiated precursor. Preferably, the primary salt, or at least one salt phase contained therein, has a low melting point. For example, the primary salt has a low melting point below 800° C.

The primary salt contains a phase characterized as a strong lithium acceptor containing a dopant cation. This strong lithium acceptor property of the primary salt is caused by an anion which readily reacts with lithium, thus being capable of extracting lithium ions from the lithium transition metal oxide. Such anion includes, for example, but is not limited to $F^-$, $PO_4^{3-}$, etc. The primary salt contains 0.1~5% by atoms of anion per transition metal cation. The dopant cation is meant to be a cation capable of diffusing into the lithium transition metal oxide to replace the transition metal ion and includes, for example, but is not limited to $Al^{3+}$, $Ca^{2+}$, $Mg^{2+}$, $Ba^{2+}$, etc. Therefore, the primary salt includes, for example, but is not limited to earth-alkali fluorides, Li-alkali earth fluorides, aluminum phosphates, aluminum fluorides and the like, or a mixture of two or more thereof.

A preferred primary salt is lithium cryolite ($Li_3AlF_6$) which has a low melting point and is commercially available. In a desirable embodiment, the primary salt contains at least 30% by weight of $Li_3AlF_6$, more preferably at least 50% by weight of $Li_3AlF_6$, and the total amount of the aluminum dopant cation per transition metal is in the range of 0.1 to 2% by atoms, more preferably 0.2 to 1.5% by atoms.

According to the experiments conducted by the inventors of the present invention, the outer layer consisting of secondary lithium salt such as LiF and $Li_3PO_4$, obtained by using primary salts as defined in the present invention, has a high thermodynamic stability versus Li/Li+ and does not decompose below 5 V, at least below 4.5 V. On the other hand, other lithium accepting primary salts of sulfates such as Co—$SO_4$, or chlorides such as Ni—Cl also contain dopant cations and delithiate a lithium transition metal oxide, and form an outer layer containing lithium; however, the outer layer, which has formed after reaction of the primary salt with the surface of lithium transition metal oxide precursor, has poor stability versus Li/Li+ and decomposes below 4.5V. Therefore, salts of sulfate and chloride types in themselves are excluded from the primary salt as defined in the present invention.

In some embodiments, the primary salt may be used along with other lithium salts, such as $Li_2CO_3$, LiOH to balance the lithium, i.e. to fully or partially re-lithiate the lithium transition metal oxide particle after the formation of the surface, etc., or an additional salt such as $LiPO_3$ which is anticipated to enhance the lithium-accepting activity of the primary salt. The amount of additional salt is in the range of 1~60% by weight based upon the total weight of primary salt.

Since primary salts like lithium cryolite are commercially available, the description of the preparation method is omitted in the present disclosure.

The coating can be achieved by various methods well known in the art. For example, the primary salt can be added in the form of fine powder, followed by a careful grinding (dry coating). Alternatively, wet routes are possible. Typical wet routes involve the preparation of gel, solutions or slurries containing the primary salt, and dipping the lithium transition metal cathode in the gel. If the primary salt has sub-micrometer particle, well dispersed in a slurry, then it is usually possible to control pH, ionic strength, etc. in a way to achieve an attractive or adhesive force between the lithium transition metal oxide precursor surface and the primary salt particle surface, but to prevent attractive forces between the primary salt particles. As a result, a thin, smooth coating of primary salt on the surface of the lithium transition metal oxide can be achieved.

After coating of the primary salt, the salt-coated lithium transition metal oxide precursor is subjected to heat treatment at not lower than 700° C. The heat treatment temperature is preferably in the range of 700° C.~1020° C. If the temperature is too low, the surface reaction will be not finished. On the other hand, if the temperature is too high, the cationic dopant will diffuse excessively fast into the particles and the properties of the secondary salt/lithium transition metal particle interface will deteriorate.

Surprisingly, despite the fact that a primary salt such as lithium cryolite decomposes to form an outer layer, the surface coverage by the final outer layer is mainly defined by the melting point of the primary salt. In the case of $Li_3AlF_6$, good coverage of the surface can be achieved at reaction temperatures below the melting point of LiF as a component of the outer layer, whereby the cathode is well protected during air exposure and in the assembled battery.

During the heat treatment, the primary salt reacts with the surface of the lithium transition metal oxide to form a doped interface layer and an outer layer (hereinafter, sometimes referred to as "secondary salt"). The reaction involves the extraction of lithium from the boundary region of the lithium transition metal oxide precursor and the insertion of dopant thereinto. The composition of the secondary salt in the outer layer is different from that of the primary salt. The secondary salt forms a thin surface film.

As will be seen in the below Examples, it was ascertained that the properties of lithium transition metal oxide can be significantly improved after the heat treatment of the powdered lithium transition metal oxide precursor with a small amount of well dispersed primary salt. For example, after heat treatment of $LiCoO_2$ particles with a mixture of lithium cryolite and $Li_2CO_3$, a surface reaction occurs which involves the insertion of dopant cation and the extraction of lithium, and during the surface reaction, a thin layer of thermodynamically and mechanically stable secondary salt is formed covering the particles.

Where $Li_3AlF_6$ is used as a primary salt, lithium ion is extracted from the lithium transition metal oxide and LiF as a secondary salt is created in the form of thin film. Similarly, where $AlPO_4$ is used as a primary salt is, lithium ion is extracted from the lithium transition metal oxide and $Li_3PO_4$ as a secondary salt is created in the form of thin film. In both cases, $Al^{3+}$ serves as a dopant cation. In an embodiment of the present invention, $LiPO_3$ may be used as an additive to the primary salt.

Surprisingly, if the primary salt does not contain a strong lithium acceptor, no lithium is then extracted from the lithium transition metal oxide, and the thin, stable, protective film of secondary salt is not formed. Also, if the primary salt does not contain a cationic dopant, the relevant properties are then not sufficiently improved. Accordingly, it can be concluded that the formation of a doped interface layer by delithiation of the surface and insertion of the cationic dopant together with the formation of an outer layer by the secondary salt are essential to achieve significantly improved high temperature properties.

The present invention also provides a cathode active material comprising the powdered lithium transition metal oxide as defined above. The cathode active material is preferably used in the preparation of rechargeable lithium ion batteries. Since various components for the cathode active material of rechargeable lithium ion batteries and the preparation method thereof are well known in the art to which the present invention pertains, the detailed description therof is omitted in this disclosure.

Without further description, it is believed that one of ordinary skill in the art can, using the preceding description and the following illustrative examples, make and utilize the present invention and practice the claimed methods. The following working examples therefore, specifically point out preferred embodiments of the present invention, and are not to be construed as limiting in any way the remainder of the present disclosure.

EXAMPLES

Example 1

A commercial $LiCoO_2$ powder of 10-20 µm potato shaped particles, hereinafter referred to as "Com-LiCoO2", was carefully mixed with a low energy ballmilled mixture (2:1 w/w) of lithium cryolite $Li_3AlF_6$ as a primary salt and $Li_2CO_3$ as an additional salt. The total content of Al (in the primary salt) per Co (in the $LiCoO_2$) was 0.8% by atoms. Heat treatment was performed at 900° C. in air for 5 hours, then the sample was slowly cooled down, ground and sieved. The sample was designated "Kry08-900".

Figure 1A:
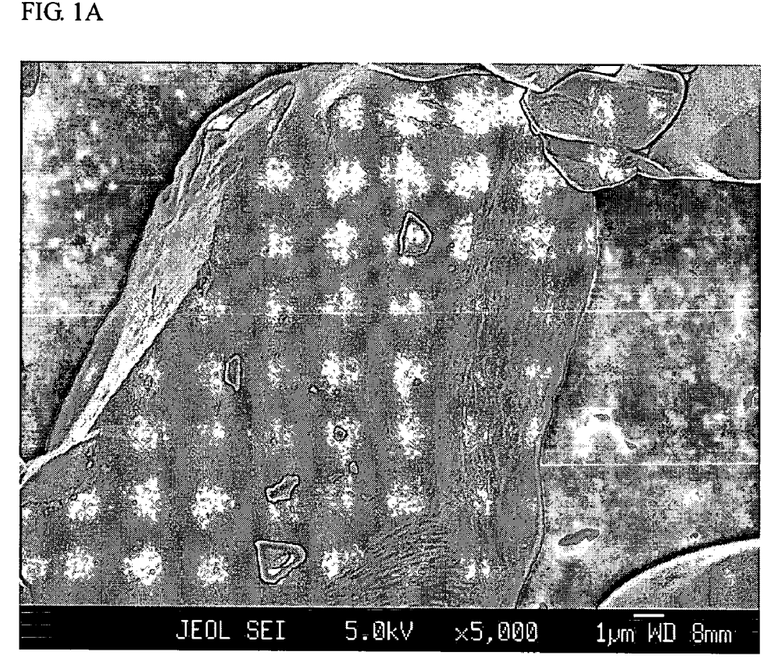
FIG. 1A is a FESEM micrograph of Kry08-900 as produced by the method according to the present invention in Example 1.
Figure 1B:
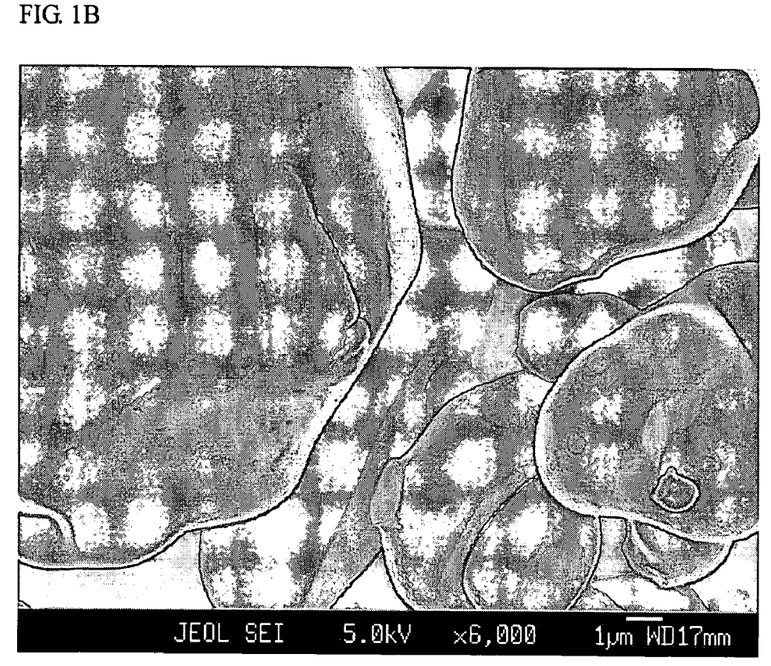
FIG. 1B is a FESEM micrograph of Comm-LiCoO2 not treated by the method according to the present invention in Example 1.

For comparison, Kry08-900 and Com-LiCoO2 were investigated by FESEM, of which micrographs are shown in FIGS. 1A and 1B, respectively. While Com-LiCoO2 has a very smooth surface, Kry08-900 exhibits surface roughness, being evidence for occurrence of a surface reaction.

Example 2

Kry08-900 obtained in Example 1 and Com-LiCoO2 subjected to heat treatment at 900° C. ("heat-treated Com-LiCoO2") were stored in a closed vial in a dry room. Coin cells (with Li-metal anode) were prepared without exposure of the cathode to moist air.

Figure 2A:
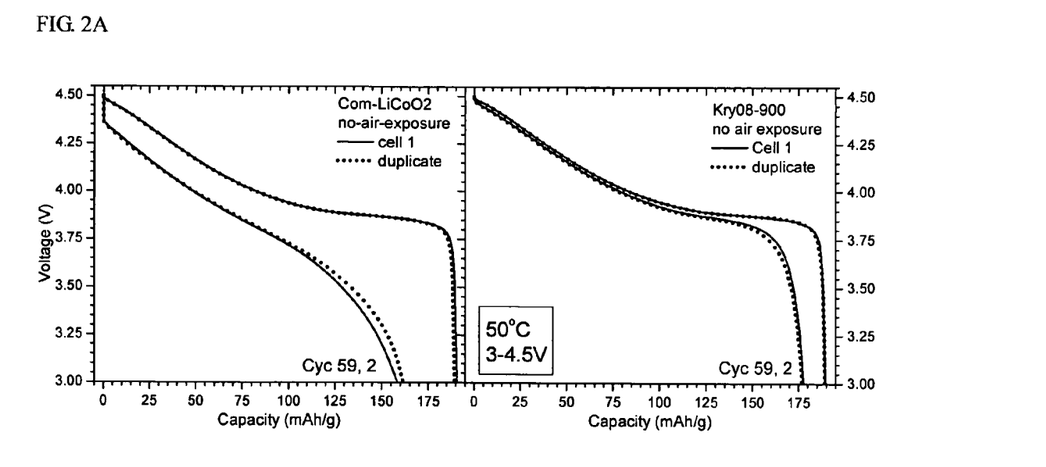
FIG. 2A is a graph showing the voltage profile of Kry08-900 of the present invention and Com-LiCoO2 as a reference at C/10 rate before and after extended cycling of coin cells which were assembled without exposure of the cathode active material to moist air in Example 2.

The voltage profiles of Kry08-900 and heat-treated Com-LiCoO2 were obtained before and after extended electrochemical cycling at an elevated temperature of 50° C. and high voltage of 3~4.5 V at C/5 rate (C1=150 mA/g). Cycling condition: 61 cycles at 50° C., charge C/5 to 4.5V, and during most of the cycles (56 cycles) the discharge rate was C/5 to 3.0V. The result is illustrated in FIG. 2A. As seen in FIG. 2A, the modified cathode materials, i.e., Kry08-900 shows greatly improved stability, higher capacity retention, and largely suppressed impedance built-up.

Example 3

Kry08-900, 900° C.-heated Com-LiCoO2 and a commercial Mg—F-containing $LiCoO_2$, as a reference sample, were exposed to humid air, containing a small amount of ethanol vapor, for more than 4 days. Thereafter, coin cells (with Li-metal anode) were prepared using these samples, respectively.

Figure 2B:
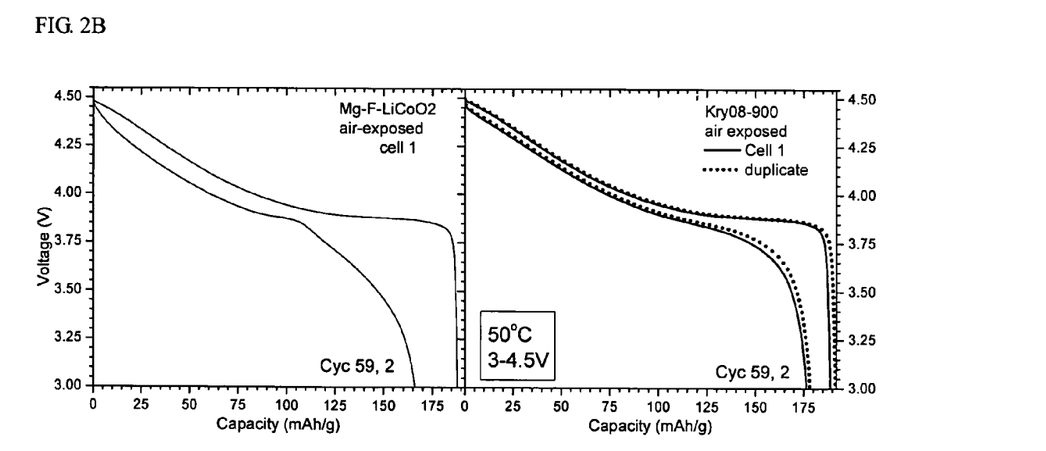
FIG. 2B is a graph showing the voltage profile of Kry08-900 of the present invention and Mg—F—LiCoO2 as a reference at C/10 rate before and after extended cycling of coin cells which were assembled after exposure of the cathode active material to moist air in Example 3.

FIG. 2B shows the voltage profiles obtained before and after extended electrochemical cycling for the air-exposed Kry08-900 and the Mg—F reference sample. The profile of Com-LiCoO2 is not shown because the sample showed serious deterioration. Cycling was performed under the same condition as in Example 2. As seen in FIG. 2B, the modified cathode material, Kry08-900, shows greatly improved stability, higher capacity retention, and suppressed impedance built-up.

Example 4

To quantify the soluble surface base, about 20 ml of water was repeatedly added to 15 g of cathode material and decanted. A total amount of 80 ml of solution was collected, and the amount of base was measured by recording the pH profile during slow addition of 0.1M HCl.

A two-step profile is typical for the presence of $Li_2CO_3$, whereas a one-step profile (LiOH type) rather originates from an ion-exchange of the surface ($LiCoO_2+H_2O \rightarrow Li_{1-x}H_xCoO_2+x\ LiOH+b\ H_2O$).

Profiles were obtained for (i) Kry08-900 before and after air exposure, (ii) Com-LiCoO2 before and after air exposure and (iii) Mg—F-reference before and after air exposure. The results are summarized in TABLE 1 below.

TABLE 1

| Sample | No exposure to moist air | | After air exposure to moist air | |
|---|---|---|---|---|
| | Form of profile | ml 0.1 M HCl to achieve pH 5 | Form of profile | ml 0.1 M HCl to achieve pH 5 |
| Kry08-900 | One plateau | 2.1 | One plateau | 2.2 |
| Com-LiCoO2 | One plateau | 2.1 | Two plateau | 3.5 |
| Mg—F-reference | One plateau | 2.0 | One plateau | 2.2 |

As seen in TABLE 1 above, the sample Kry08-900 is stable against deterioration in air.

Example 5

Air-exposed Com-LiCoO2 and air-exposed Kry08-900 were slowly heated under a flow of argon atmosphere containing 10 ppm oxygen. The uptake of oxygen from the gas to oxidize samples was measured by a solid state coulometric oxygen titration. The result is disclosed in FIG. 3.

Figure 3:
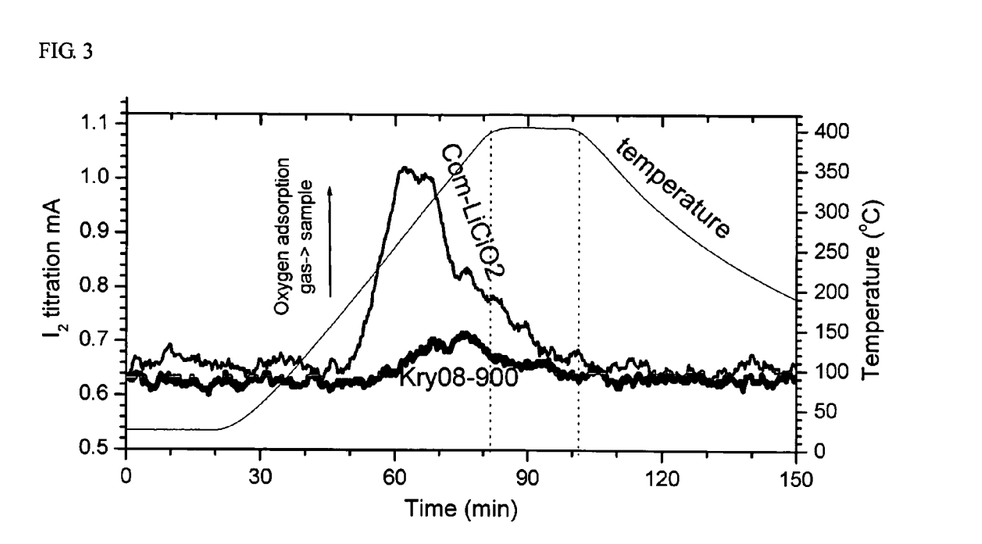
FIG. 3 is a graph showing the result of oxygen coulometric measurement of Kry08-900 and Com-LiCoO$_2$ during heating in O$_2$-containing atmosphere in Example 5.

Referring to FIG. 3, during heat treatment in the oxygen-containing atmosphere, Com-LiCoO2 adsorbed oxygen, whereas the Kry08-900 sample was inert. Quantification showed that the surface modification stabilized the surface against reductive attack in air. The total molar amount of titrated $Li_2CO_3$ obtained in Example 4 and that of $O_2$ uptake were approximately similar.

From the experimental results of Examples 2~5, the below facts were ascertained:

(1) Com-LiCO2 forms $Li_2CO_3$ and the surface thereof is reduced when exposed to air. Formation of $Li_2CO_3$ and the reduced surface result in very poor elevated Temp/high voltage properties.

(2) The heat-treated Com-LiCoO2 does not contain $Li_2CO_3$ and the surface thereof is not reduced. However, the elevated Temp/high voltage properties are slightly improved.

(3) Mg—F-reference and Kry08-900 do not form $Li_2CO_3$. However, in the case of Mg—F-reference, only a slight improvement of elevated Temp/high voltage properties is observed.

(4) Kry08-900 shows high stability of the surface against reduction in air and also against reaction with electrolyte after assembly of the battery.

Example 6

The procedure was repeated in the same manner as in Example 1 to make $Kry^{08}$-900 except that the heat treatment was carried out at 850° C. and the Al content was 0.5% by atoms. As a reference sample, LiF-sample was prepared by using LiF as the primary salt containing 3% by atoms of fluorine.

FESEM investigation of these samples showed that the surface of Kry08-900 has an increased roughness, whereas the surface of the LiF-sample exhibits smoothness similar to that of the Com-LiCoO2. Therefore, it was confirmed that LiF alone is not suitable as a primary salt in the preparation method of the present invention.

Example 7

The procedure was repeated in the same manner as in Example 1 except that a core-shell-type $LiMO_2$ ($M=Co_{0.8}(Mn_{1/2}Ni_{1/2})_{0.2}$) was used as a precursor and the heat treatment was performed at 920° C. More specifically, the inner region of the potato-shaped particle consisted of $LiCoO_2$, and the outer region thereof consisted of $LiMO_2$ with $M \cong Co_{0.6}(Mn_{1/2}Ni_{1/2})_{0.4}$. The resulting particle obtained after heat treatment was designated "118 g-Kry". In addition, a reference sample was prepared in the same manner except for using no primary salts. Then, coin cells were prepared using these samples and electrochemically tested. The results are disclosed in FIGS. 4A and 4B.

Figure 4A:
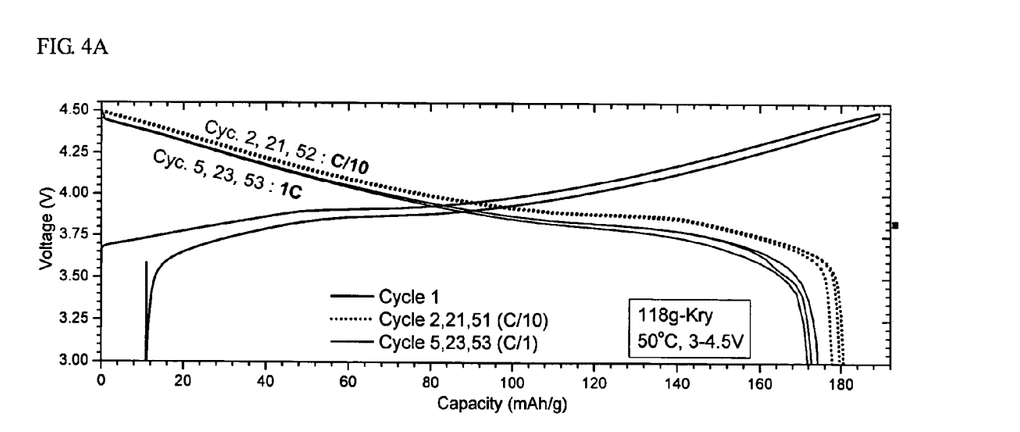
FIG. 4A is a graph showing the cycling stability of 118 g-Kry according the present invention during extended cycling in Example 8.
Figure 4B:
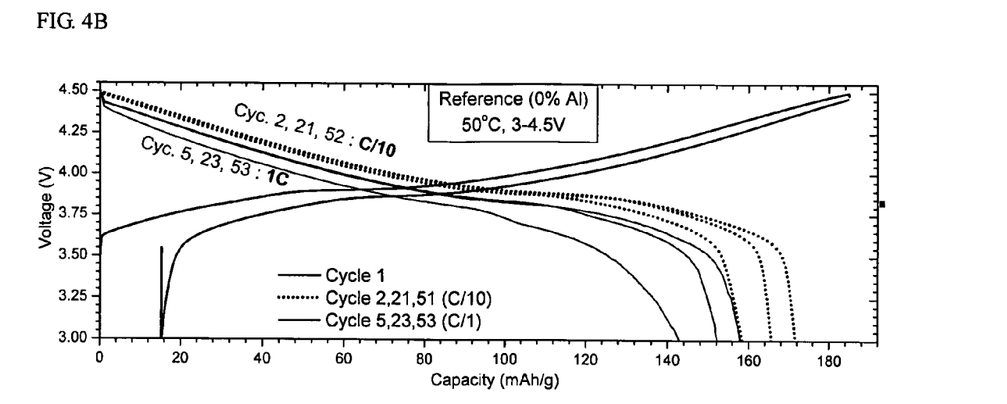
FIG. 4B is a graph showing the cycling stability of a reference sample during extended cycling in Example 7.

FIGS. 4A and 4B shows that a clear improvement of cycling stability at elevated temperature of 50° C. (higher capacity retention, less impedance built-up) was achieved with 118 g-Kry.

Example 8

Two commercial samples were modified by addition of primary salt and heat treatment. These commercial samples had the composition of $Li\{Li_x[Co_{1/6}(Mn_{1/2}Ni_{1/2})_{5/6}]_{1-x}O_2$ ($x \cong 0.05$) and $LiCo_{1/3}Mn_{1/3}Ni_{1/3}O_2$, respectively.

As a primary salt, used were $Li_3AlF_6$ and $Li_2CO_3$ in a mass ratio of 3:1. The salt-coated samples were heated to 850° C. During the heat treatment, lithium was extracted from the $LiMO_2$, whereby the Li:M ratio of Li-M-$O_2$ was slightly reduced, particularly near to the surface, and the amount of soluble base decreased. The smaller lithium excess did not cause a significant increase of cation mixing, and the rate performance was not deteriorated. After heat treatment, the surface of the lithium transition metal oxide was protected by a thin film of secondary salt, and the surface was doped by aluminum. The elevated temperature/high voltage properties were improved.

Example 9

A stoichiometric (Li:M=1:1) $Li(Mn_{1/2}Ni_{1/2})_{0.8}Co_{0.2}O_2$ was used as a precursor. Samples with Li stoichiometry being increased were prepared by adding 2, 4, 7, 10% by atoms of Li per transition metal in the form of $Li_2CO_3$, followed by grinding and heat treatment at 900° C. By this process, Li-rich layered lithium transition metal oxides with the composition of $Li[Li_xM_{1-x}]O_2$, wherein $x \cong 1$, 2, 3.5 and 5%, were prepared. A careful analysis of lattice constants and lattice volume showed that the unit cell volume shrinks. While the stoichiometric sample has a volume of 34.0 Å$^3$, the volume shrinkage was approximately 0.12% per % of lithium addition, and the 5% Li excess sample had a unit cell volume of 33.8 Å$^3$.

The extraction of lithium from a $Li(Mn_{1/2}Ni_{1/2})_{0.8}Co_{0.2}O_2$ was investigated by starting with the 5% excess sample, and adding $Li_3AlF_6$, and using 0.5, 1 and 2.5% by atoms of Al per transition metal, followed by grinding and heat treatment at 900° C.

An analysis of lattice constants and lattice volume showed that the unit cell increases to finally reach approximately 34.0 Å$^3$. The increase is caused by the extraction of lithium from the cathode according the schematic reaction.

Rietveld refinement was applied and the result was confirmed.

The present example ascertains the Li-accepting properties of the Li-cryolite primary salt.

The present invention being thus described, it will be obvious that the same may be varied in many ways. Such variations are not to be regarded as a departure from the spirit and scope of the invention and all such modifications would be obvious to one skilled in the art.

What is claimed is:

1. A powdered lithium transition metal oxide comprising a lithium transition metal oxide particle, a cation doped interface layer formed near the surface of the particle, and a thermodynamically and mechanically stable outer layer, wherein the cation doped interface layer is a reaction product of (i) the lithium transition metal oxide and (ii) a lithium acceptor compound supplying the cation, and the lithium transition metal oxide is $LiCoO_2$ having a layered crystal structure, or a mixed Li—Mn—Ni—Co-oxide having a layered crystal structure.

2. The powdered lithium transition metal oxide according to claim 1, wherein the lithium transition metal oxide further contain cationic dopants.

3. The powdered lithium transition metal oxide according to claim 1, wherein the dopant cation is Al or Al/Mg.

4. The powdered lithium transition metal oxide according to claim 3, wherein the dopant cation is Al.

5. The powdered lithium transition metal oxide according to claim 1, wherein the lithium acceptor is phosphate and/or fluorine anions, and the concentration of fluorine anion is 0.5~5% by atoms F per transition metal cation, and the concentration of phosphate anion is 0.2~2% by atoms per transition metal cation.

6. The powdered lithium transition metal oxide according to claim 1, wherein the outer layer is a surface film which is mechanically stable and also has thermodynamic stability under cathodic conditions to at least 5V versus Li/Li$^+$.

7. The powdered lithium transition metal oxide according to claim 1, wherein the lithium acceptor is lithium cryolite Li$_3$AlF$_6$ and the cation is aluminum, in which the concentration of fluorine is 0.5-5% by atoms per metal cation.

8. The powdered lithium transition metal oxide according to claim 1, wherein the lithium acceptor has a low melting point below 800° C.

9. A method of preparing the powdered lithium transition metal oxide according to claim 1, comprising the steps of:
    (a) coating the surface of a powdered lithium transition metal oxide with a primary salt containing a dopant cation and being a strong lithium acceptor; and
    (b) subjecting the salt-coated metal oxide to heat treatment at a temperature of not less than 700° C.

10. The method according to claim 9, wherein the primary salt is of a single salt phase or a mixture of two or more salt phases.

11. The method according to claim 9, wherein the lithium acceptor is one or more selected from the group consisting of F$^-$ and PO$_4^-$, and the dopant cation is one or more selected from the group consisting of Al$^{3+}$, Ca$^{2+}$, Mg$^{2+}$ and Ba$^{2+}$.

12. The method according to claim 9, wherein the primary salt contains 0.1~5% by atoms of dopant cation per transition metal cation.

13. The method according to claim 9, wherein the primary salt contains at least 30% by weight of Li$_3$AlF$_6$ and the total amount of the aluminum dopant cation per transition metal is in the range of 0.1 to 2% by atoms.

14. The method according to claim 13, wherein the primary salt contains at least 50% by weight of Li$_3$AlF$_6$ and the total amount of the aluminum dopant cation per transition metal is in the range of 0.2 to 1.5% by atoms.

15. The method according to claim 9, wherein the primary salt further includes other lithium salts of Li$_2$CO$_3$, LiPO$_3$ and/or LiOH in the range of 1~60% by weight based upon the total weight of salts including the primary salt.

16. The method according to claim 9, wherein the primary salt is a mixture of Li$_3$AlF$_6$ and Li$_2$CO$_3$ in which the content of Li$_3$AlF$_6$ is at least 30% by weight.

17. The method according to claim 9, wherein the heat treatment temperature is in the range of 700° C.~1020° C.

18. A cathode active material for rechargeable lithium ion battery, comprising the powdered lithium transition metal oxide according to claim 1.

19. The powdered lithium transition metal oxide according to claim 1, wherein the cationic dopants are one or more selected from the group consisting of Mg, Al, Ti, Cu, Fe, Zn, Ta, Cr, B, and Ga.

* * * * *